United States Patent
Nakamura et al.

(10) Patent No.: US 10,399,303 B2
(45) Date of Patent: Sep. 3, 2019

(54) RESIN-COATED METAL SHEET FOR CAN LIDS

(71) Applicant: JFE STEEL CORPORATION, Tokyo (JP)

(72) Inventors: Norihiko Nakamura, Tokyo (JP); Yoichiro Yamanaka, Tokyo (JP); Junichi Kitagawa, Tokyo (JP); Hiroki Nakamura, Tokyo (JP); Hiroshi Kubo, Tokyo (JP); Yusuke Nakagawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 180 days.

(21) Appl. No.: 15/532,443

(22) PCT Filed: Dec. 8, 2015

(86) PCT No.: PCT/JP2015/084373
§ 371 (c)(1),
(2) Date: Jun. 1, 2017

(87) PCT Pub. No.: WO2016/093219
PCT Pub. Date: Jun. 16, 2016

(65) Prior Publication Data
US 2017/0266924 A1    Sep. 21, 2017

(30) Foreign Application Priority Data
Dec. 12, 2014   (JP) ................................. 2014-252221

(51) Int. Cl.
*B32B 15/09*    (2006.01)
*B32B 27/08*    (2006.01)
(Continued)

(52) U.S. Cl.
CPC ............. *B32B 15/09* (2013.01); *B32B 15/18* (2013.01); *B32B 15/20* (2013.01); *B32B 27/08* (2013.01);
(Continued)

(58) Field of Classification Search
None
See application file for complete search history.

(56) References Cited

U.S. PATENT DOCUMENTS 5,069,962 A * 12/1991 Okazaki ............... G11B 5/7315
428/323
5,384,354 A * 1/1995 Hasegawa ............... B29C 55/12
524/539

(Continued)

FOREIGN PATENT DOCUMENTS

CN     1052631 A      7/1991
CN   104023974 A      9/2014
(Continued)

OTHER PUBLICATIONS

Sep. 5, 2017 Office Action issued in Japanese Patent Application No. 2016-534755.
(Continued)

*Primary Examiner* — Vivian Chen
(74) *Attorney, Agent, or Firm* — Oliff PLC

(57) ABSTRACT

A resin-coated metal sheet for can lids includes a metal sheet coated with thermoplastic resin films on both surfaces and formed into a can lid. A thermoplastic resin film A based on polybutylene terephthalate (PBT) and polyethylene terephthalate (PET) is heat-fused on a surface of the metal sheet serving as an exterior surface of the can lid, and a thermoplastic resin film B based on polyethylene terephthalate (PET) is heat-fused on a surface of the metal sheet serving as an interior surface of the can lid. A composition ratio (wt %) of PBT/PET in the thermoplastic resin film A on the exterior surface is (PBT/PET)=(40/60) to (80/20), and the thermoplastic resin film B on the interior surface includes 95 mol % or more of PET.

1 Claim, 3 Drawing Sheets

(51) Int. Cl.
| | |
|---|---|
| *B32B 27/36* | (2006.01) |
| *B65D 1/16* | (2006.01) |
| *B32B 27/20* | (2006.01) |
| *B65D 17/00* | (2006.01) |
| *B65D 65/42* | (2006.01) |
| *B32B 15/08* | (2006.01) |
| *C08L 67/03* | (2006.01) |
| *C08L 67/02* | (2006.01) |
| *C08L 67/00* | (2006.01) |
| *B65D 25/34* | (2006.01) |
| *B65D 1/12* | (2006.01) |
| *B65D 25/14* | (2006.01) |
| *B65D 43/02* | (2006.01) |
| *B32B 15/18* | (2006.01) |
| *B32B 15/20* | (2006.01) |

(52) U.S. Cl.
CPC .............. *B32B 27/20* (2013.01); *B32B 27/36* (2013.01); *B65D 1/165* (2013.01); *B65D 17/08* (2013.01); *B65D 65/42* (2013.01); *B32B 15/08* (2013.01); *B32B 2250/03* (2013.01); *B32B 2250/244* (2013.01); *B32B 2255/06* (2013.01); *B32B 2255/205* (2013.01); *B32B 2270/00* (2013.01); *B32B 2307/00* (2013.01); *B32B 2307/30* (2013.01); *B32B 2307/308* (2013.01); *B32B 2307/31* (2013.01); *B32B 2307/704* (2013.01); *B32B 2367/00* (2013.01); *B32B 2435/00* (2013.01); *B32B 2435/02* (2013.01); *B32B 2439/66* (2013.01); *B65D 1/12* (2013.01); *B65D 1/16* (2013.01); *B65D 17/00* (2013.01); *B65D 17/02* (2013.01); *B65D 25/14* (2013.01); *B65D 25/34* (2013.01); *B65D 43/02* (2013.01); *C08L 67/00* (2013.01); *C08L 67/02* (2013.01); *C08L 67/03* (2013.01); *C08L 2205/02* (2013.01); *C08L 2205/025* (2013.01); *Y10T 428/31681* (2015.04); *Y10T 428/31786* (2015.04)

(56) References Cited

U.S. PATENT DOCUMENTS

| | | | | |
|---|---|---|---|---|
| 5,618,621 | A * | 4/1997 | Hasegawa | B32B 27/36 428/343 |
| 5,714,273 | A | 2/1998 | Wake et al. | |
| 5,753,377 | A * | 5/1998 | Takahashi | B32B 15/08 428/480 |
| 5,858,507 | A | 1/1999 | Yoshida | B29C 55/065 264/288.4 |
| 6,197,430 | B1 * | 3/2001 | Asakura | B29C 55/16 428/847.2 |
| 9,873,539 | B2 * | 1/2018 | Yamanaka | B05D 7/14 |
| 9,993,998 | B2 * | 6/2018 | Yamanaka | B05D 7/14 |
| 2003/0039778 | A1 * | 2/2003 | Sato | B32B 15/08 428/35.7 |
| 2005/0118442 | A1 * | 6/2005 | Itoh | B32B 15/08 428/480 |
| 2006/0147733 | A1 * | 7/2006 | Yamanaka | B32B 15/08 428/458 |
| 2007/0031688 | A1 * | 2/2007 | Suzuki | B32B 15/08 428/458 |
| 2007/0036995 | A1 * | 2/2007 | Suzuki | B32B 1/02 428/458 |
| 2010/0310824 | A1 * | 12/2010 | Oshima | B32B 27/36 428/141 |
| 2011/0051053 | A1 * | 3/2011 | Okamura | G02B 3/0056 349/96 |
| 2014/0023841 | A1 * | 1/2014 | Suzuki | C08K 3/32 428/213 |
| 2014/0272974 | A1 * | 9/2014 | Goff | C12Q 1/6886 435/6.11 |
| 2014/0339123 | A1 | 11/2014 | Nakagawa et al. | |
| 2016/0009444 | A1 * | 1/2016 | Nakagawa | B32B 15/09 206/524.2 |
| 2016/0145462 | A1 * | 5/2016 | Kawamura | C08L 67/02 428/336 |
| 2016/0257099 | A1 * | 9/2016 | Yamanaka | B65D 25/14 |
| 2017/0008256 | A1 | 1/2017 | Yamanaka et al. | |
| 2018/0065339 | A1 * | 3/2018 | Yamanaka | B32B 15/09 |

FOREIGN PATENT DOCUMENTS

| | | | |
|---|---|---|---|
| EP | 1625934 | A1 | 2/2006 |
| EP | 2799227 | A1 | 11/2014 |
| JP | H05-331302 | A | 12/1993 |
| JP | H06-155660 | A | 6/1994 |
| JP | H07-145252 | A | 6/1995 |
| JP | H09-012743 | A | 1/1997 |
| JP | H10-110046 | A | 4/1998 |
| JP | 10-138333 | A * | 5/1998 |
| JP | 11-138693 | A * | 5/1999 |
| JP | 2000-313755 | A | 11/2000 |
| JP | 2001-004545 | A * | 1/2001 |
| JP | 2001-021496 | A * | 1/2001 |
| JP | 2001-335682 | A | 12/2001 |
| JP | 2002-193256 | A | 7/2002 |
| JP | 2002-225186 | A | 8/2002 |
| JP | 2004-17438 | A | 1/2004 |
| JP | 2004-168365 | A | 6/2004 |
| JP | 3678339 | B2 | 8/2005 |
| JP | 2005-342911 | A | 12/2005 |
| JP | 4101963 | B2 | 6/2008 |
| JP | 2009-13242 | A | 1/2009 |
| JP | 2010-105263 | A * | 5/2010 |
| JP | 2014-166856 | A | 9/2014 |
| KR | 10-2012-0058402 | A | 6/2012 |
| WO | 2013/099563 | A1 | 7/2013 |
| WO | 2015/064100 | A1 | 5/2015 |
| WO | 2015/068720 | A1 | 5/2015 |
| WO | 2015/125459 | A1 | 8/2015 |

OTHER PUBLICATIONS

Mar. 1, 2016 Search Report issued in International Patent Application No. PCT/JP2015/084373.
Jan. 23, 2018 Office Action issued in Chinese Patent Application No. 201580066548.9.
Nov. 14, 2017 Extended Search Report issued in European Patent Application No. 15867973.8.
"Database WPI Week 201033", Thomson Scientific, London, GB, AN 2010-F11002,XP002775289, (2010).

* cited by examiner

RESIN-COATED METAL SHEET FOR CAN LIDS

FIELD

The present invention relates to a resin-coated metal sheet for can lids, mainly for use in lids of food cans.

BACKGROUND

Conventionally, the interior and exterior surfaces of beverage cans and food can containers made of metal are coated with solvent-based paint composed mainly of thermosetting resin. This is for the purpose of keeping the flavor of contents, preventing corrosion of metal serving as the material of beverage cans and food can containers, or improving the design of the exterior surfaces of beverage cans and food can containers or protecting the printed surfaces. The solvent-based paint, however, has problems in terms of work safety and environmental impact, because heating at high temperatures is required for forming coatings and a large amount of solvent is produced during heating. For this reason, metal coatings with thermoplastic resin have been proposed as a corrosion prevention method that does not require solvent. Among thermoplastic resins, especially polyester resin is excellent in formability, heat-resistance, and the like. In this respect, films for metal lamination based on polyester resin have been under development.

When a laminated metal sheet (resin-coated metal sheet) formed by laminating (coating) a resin film such as polyester is applied to a lid member for beverage cans or a lid member for food can containers, the lid member is seamed at high speed for improving productivity to cause film cracking or film peeling on the exterior film. Another problem is that the cyclic trimer in polyester resin is deposited on the resin surface during the high-temperature sterilization process such as the retort process to impair the design, or that the resin layer itself is discolored and looks whitish during the retort process (a phenomenon called whitening). On the other hand, the resin for use on the interior surface requires corrosion resistance against the contents (contents resistance) and adhesion when the resin is in contact with the contents for a long time.

Since the required performance differs between the interior and exterior surfaces of the metal sheet as described above, films also differ between the interior and the exterior of the metal sheet. When different films are used for the interior and exterior surfaces, the physical properties of the films, especially the melting point, vary to pose operational challenges in laminating the films simultaneously on the interior and exterior surfaces. That is, in order to ensure the adhesion between the film with a high melting point and the metal sheet, it is necessary to laminate the film with a high melting point at high temperatures. However, when the film with a high melting point is laminated at high temperatures, not only the interface between the film with a low melting point and the metal sheet but also the entire layer of the film with a low melting point is melted, and the film with a low melting point may adhere (fuse) to the roll for pressure-bonding the film.

A method for improving such a problem is disclosed in Patent Literature 1, which provides a double film-laminated can lid with favorable seaming resistance, in which both surfaces of a metal sheet are coated with thermoplastic resin films, the amorphous ratio of the thermoplastic resin film layer on the exterior of the can lid is 60% or more, and the oriented crystalline layer is left in part of the thermoplastic resin film layer on the interior of the can lid.

Patent Literature 2 discloses a metal sheet coated with a film on the container exterior surface, which is polyester including 30 to 50% by mass of polyester having ethylene terephthalate as a main repeating unit and 50 to 70% by mass of polyester having butylene terephthalate as a main repeating unit. This prevents the occurrence of white spots (whitening) by setting the shortest half-crystallization time to 100 seconds or less to use heat in the retort process for crystallization and increase the crystallization rate. According to the description, this metal sheet has a polyester resin layer of a double-layer structure on the interior surface of the container, and the upper polyester resin layer is polyethylene terephthalate or copolymerized polyethylene terephthalate in which isophthalic acid is copolymerized as an acid component at a ratio equal to or less than 6 mol %. In addition, the upper polyester resin layer contains 0.1 to 5% by mass of olefin-based wax, and the lower polyester resin layer is copolymerized polyethylene terephthalate in which isophthalic acid is copolymerized as an acid component at a ratio equal to or less than 10 to 22 mol %. Similarly, Patent Literatures 3 to 6 disclose techniques for improving whitening resistance of the exterior film.

Patent Literature 7 describes a polyester composition containing 30 to 50% by mass of polyester having ethylene terephthalate as a main repeating unit and 50 to 70% by mass of polyester having butylene terephthalate as a main repeating unit. The technique for thus suppressing discoloring in the retort process is described. Patent Literature 7 also describes a technique in which the melting point of the resin is defined and the interface is melted when the resin is heat-fused. Patent Literatures 8 and 9 also describe techniques for suppressing discoloring during the retort process.

Patent Literatures 10 and 11 disclose a steel sheet laminated with different films on the can interior surface and the can exterior surface. In addition, Patent Literature 10 describes a technique for improving whitening resistance by using a polyester film with a contact angle of 70 to 120° on the can interior surface and laminating PET-PBT with a crystallization temperature of 120° C. or lower on the can exterior surface. Patent Literature 11 discloses a technique of laminating PET-PBT on the can exterior surface and copolymerized PET on the can interior surface.

CITATION LIST

Patent Literature

Patent Literature 1: Japanese Laid-open Patent Publication No. 2002-193256

Patent Literature 2: Japanese Laid-open Patent Publication No. 2005-342911

Patent Literature 3: Japanese Laid-open Patent Publication No. 05-331302

Patent Literature 4: Japanese Laid-open Patent Publication No. 2000-313755

Patent Literature 5: Japanese Laid-open Patent Publication No. 2001-335682

Patent Literature 6: Japanese Laid-open Patent Publication No. 06-155660

Patent Literature 7: Japanese Laid-open Patent Publication No. 10-110046

Patent Literature 8: Japanese Laid-open Patent Publication No. 09-012743

Patent Literature 9: Japanese Laid-open Patent Publication No. 07-145252

Patent Literature 10: Japanese Laid-open Patent Publication No. 2004-168365

Patent Literature 11: Japanese Laid-open Patent Publication No. 2014-166856

SUMMARY

Technical Problem

Unfortunately, although the can lid described in Patent Literature 1 has satisfactory seaming resistance of the exterior film, the whitening resistance during the retort process is insufficient, because ethyleneterephthalate-isophthalate copolymer is used and the crystallization rate is insufficient. In the techniques described in Patent Literatures 2 to 6, although the whitening resistance of the exterior film is improved, the crystalline state is not taken into consideration, and the peeling resistance for preventing film peeling even in high-speed seaming is not yet improved. In addition, because of the presence of a copolymerization component on the interior, the copolymerization component may dissolve, and there is concern about the contents resistance.

The techniques described in Patent Literatures 7 to 9 merely describe one side of the steel sheet for use in containers and do not disclose the resin on the opposite surface, although both surfaces require heat-fusion simultaneously. As previously mentioned, the performance required for the can interior and exterior surfaces differs in a steel sheet for cans, which arises a need for combining different kinds of resins. While different kinds of resins are used, they are preferably heat-fused simultaneously, considering the productivity. The resins copolymerized to have equivalent melting points have been combined, but the addition of a copolymerization component leads to a cost increase. When the melting point varies greatly, the resin with a high melting point needs to be heated to a high melting point for heat fusion, but the resin with a melting point exceeds its melting point and may adhere to the roll or the like to impair the productivity. The above-described techniques do not consider these points, and there is concern about poor adhesion of the film, lack of competitiveness of the products, or poor productivity.

In the technique described in Patent Literature 10, although whitening resistance is superior, the seaming resistance is insufficient because the crystal structure of the resin is not controlled. In addition, since the interior resin is isophthalic acid-based copolymerized PET, the copolymerization component may dissolve and there is concern of poor contents resistance. Patent Literature 10 neither discloses nor suggests a method of simultaneously laminating different films on the exterior and the interior. The technique described in Patent Literature 11 adjusts the copolymerization ratio so that the exterior film and the interior film both have a melting point of 220 to 256° C., and there is no disclosure or suggestion as to a method of simultaneously laminating the exterior film and the interior film having different melting points.

The present invention is made in order to solve the aforementioned problem and is aimed to provide a resin-coated metal sheet for can lids, in which film peeling or film cracking does not occur even when seaming of can lids is performed at high speed, and the seaming resistance is excellent, the design of the appearance after the retort process and the contents resistance are excellent, and the adhesion of the film can be kept.

Solution to Problem

The inventors of the present invention have conducted elaborate studies on combinations and crystal structures of the films on the interior and exterior surfaces of a can lid and have found that the above-described problems can be solved by controlling the crystal structures of the interior and exterior surfaces. In the following description, in order to avoid confusion between the interior and exterior films, the film on the can exterior surface may be referred to as thermoplastic resin film A and the film on the can interior surface may be referred to as thermoplastic resin film B.

A resin-coated metal sheet for can lids according to the present invention includes a metal sheet coated with thermoplastic resin films on both surfaces and formed into a can lid, wherein a thermoplastic resin film A based on polybutylene terephthalate (PBT) and polyethylene terephthalate (PET) is heat-fused on a surface of the metal sheet serving as an exterior surface of the can lid, and a thermoplastic resin film B based on polyethylene terephthalate (PET) is heat-fused on a surface of the metal sheet serving as an interior surface of the can lid, a composition ratio (wt %) of PBT/PET in the thermoplastic resin film A on the exterior surface is (PBT/PET)=(40/60) to (80/20), and the thermoplastic resin film B on the interior surface includes 95 mol % or more of PET, a melting point derived from PET of the thermoplastic resin film B on the interior surface is 250° C. or higher and 265° C. or lower and is higher than a melting point derived from PBT in the thermoplastic resin film A on the exterior surface by 25° C. or more, in the thermoplastic resin film A on the exterior surface, a Raman band intensity ratio ($I_{90}/I_0$) between Raman band intensity ($I_0$) of 1615±10 $cm^{-1}$ that is measured on a polarization plane horizontal to the surface by laser Raman spectroscopy and Raman band intensity ($I_{90}$) of 1615±10 $cm^{-1}$ that is measured on a polarization plane vertical to the surface by laser Raman spectroscopy is 0.60 or more, and in the thermoplastic resin film B on the interior surface, half-width of Raman band of 1730±10 $cm^{-1}$ that is measured on a polarization plane horizontal to the surface by laser Raman spectroscopy is 15 to 20 $cm^{-1}$.

Advantageous Effects of Invention

The present invention provides a resin-coated metal sheet for can lids, in which film peeling or film cracking does not occur even when seaming of can lids is performed at high speed, and the seaming resistance is excellent, the design of the appearance after the retort process and the contents resistance are excellent, and the adhesion of the film can be kept.

DESCRIPTION OF EMBODIMENTS

An embodiment of the present invention will be described in details below with reference to the drawings. It is noted that the present invention is not intended to be limited by this embodiment.

<Laser Raman Spectroscopy>

Figure 1:
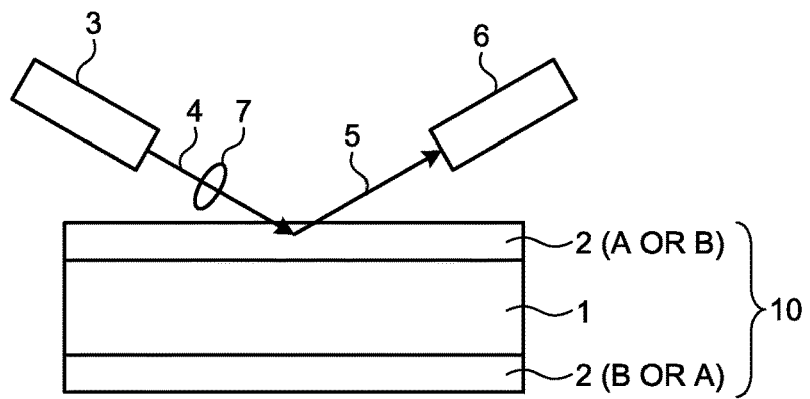
FIG. 1 is a diagram for explaining laser Raman spectroscopy applied to the present invention.

Referring first to FIG. 1, the laser Raman spectroscopic measurement method that is applied to the present invention will be described. As shown in FIG. 1, in a resin-coated metal sheet 10 having resin films 2 laminated on both surfaces of a metal sheet 1, laser light 4 emitted from a laser oscillator 3 is applied to the resin film 2 on one surface, and Raman scattering light 5 is dispersed through a spectroscope 6. The beam diameter of laser light 4 emitted in the laser Raman spectroscopy is variable through a lens 7 to enable evaluation of the degree of crystallinity in a region of a required size. Then, the beam diameter of the emitted laser light 4 is narrowed to enable evaluation of the degree of crystallinity in a minute region of the resin film 2. In the present embodiment, the degree of crystallinity in a given part in a cross section in the thickness direction of the resin film 2 was evaluated by the laser Raman spectroscopic measurement method shown in FIG. 1.

Here, it is known that the half-width of Raman band in the vicinity of 1730 cm$^{-1}$ (derived from C=O stretching vibrations) obtained from the laser Raman spectroscopy is inversely proportional to the density of the resin film 2. On the other hand, it is known that the relation between the density of the resin film 2 and the degree of crystallinity in terms of volume fraction is expressed as Formula (1) below.

[Formula (1)]

$$\text{The degree of crystallinity in terms of volume fraction } (\%) = (\rho - \rho a)/(\rho c - \rho a) \times 100 \quad (1)$$

where

ρ is the actually measured value of density,

ρc is the density of a perfect crystal, and

ρa is the density of a perfect amorphous.

It is therefore possible to obtain the density of the resin film 2 in a portion radiated with laser light 4 by measuring the half-width of the Raman band in the vicinity of 1730 cm$^{-1}$ (derived from C=O stretching vibrations). Furthermore, it is possible to obtain the degree of crystallinity in terms of volume fraction (hereinafter referred to as the degree of crystallinity) of the resin film 2 according to Formula (1) above.

The Raman band seen in the vicinity of 1615 cm$^{-1}$ in the laser Raman spectroscopy is derived from the benzene ring C=C stretching vibrations. As for the C=C stretching vibrations, the degree of crystallinity can be measured by polarizing the applied laser light 4 and obtaining the ratio between the Raman band intensity measured on a polarization plane horizontal to the surface of the resin film 2 and the Raman band intensity on the vertical polarization plane.

<Metal Sheet>

Steel sheets or aluminum sheets widely used as can container materials can be used for the metal sheet 1 serving as the base of the resin-coated metal sheet 10 of the present invention. The metal sheet 1 may be subjected to a variety of surface treatment. A preferable example is tin free steel (hereinafter TFS) which is a surface-treated steel sheet with double coating, including metal chromium as the lower layer and chromium hydroxide as the upper layer. The amount of adhesion of the metal chromium and chromium hydroxide layers in TFS is not limited to any particular value. In terms of formability and corrosion resistance, it is preferable that the metal chromium layer is in the range of 70 to 200 mg/m$^2$ and the chromium hydroxide layer is in the range of 10 to 30 mg/m$^2$.

<Resin Film Coating on Metal Sheet>

In the resin-coated metal sheet 10 of the present invention, the resin film 2 heat-fused on one of the two surfaces of the metal sheet 1, namely, the exterior surface of the can lid formed from the resin-coated metal sheet 10, is composed of a thermoplastic resin film A based on polybutylene terephthalate (PBT) and polyethylene terephthalate (PET). The resin film 2 heat-fused on the surface that is the interior surface of the can lid is composed of a thermoplastic resin film B based on polyethylene terephthalate (PET).

The composition ratio of PBT/PET (wt %) in the exterior resin film A is (PBT/PET)=(40/60) to (80/20), and the interior resin film B includes 95 mol % or more of PET. The melting point derived from PBT in the thermoplastic resin film A is lower than the melting point derived from PET in the thermoplastic resin film B by 25° C. or more.

In the exterior resin film A, the Raman band intensity ratio ($I_{90}/I_0$) between the Raman band intensity ($I_0$) of 1615±10 cm$^{-1}$ measured on the polarization plane horizontal to the surface of the resin film 2 by the laser Raman spectroscopy and the Raman band intensity ($I_{90}$) of 1615±10 cm$^{-1}$ measured on the vertical polarization plane is 0.60 or more, preferably 0.70 or more. Here, the Raman band intensity ($I_0$) of 1615±10 cm$^{-1}$ measured on the polarization plane horizontal to the surface has a larger value as the amount of crystalline component in the surface direction increases. On the other hand, the Raman band intensity ($I_{90}$) of 1615±10 cm$^{-1}$ measured on the vertical polarization plane has a larger value as the amount of crystalline component in the thickness direction increases. This means that as the value of the Raman band intensity ratio ($I_{90}/I_0$) increases, the crystalline component in the surface direction decreases and the crystalline component in the thickness direction increases.

Figure 2:
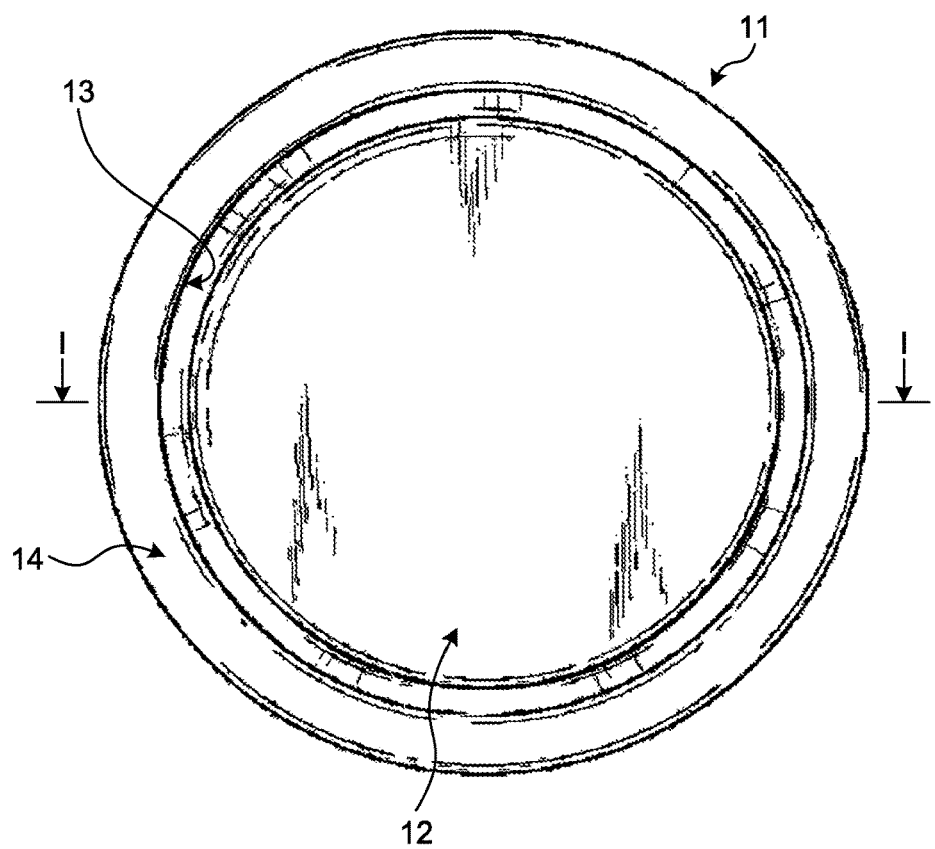
FIG. 2 is a diagram illustrating a can lid formed from a resin-coated metal sheet.
Figure 3:
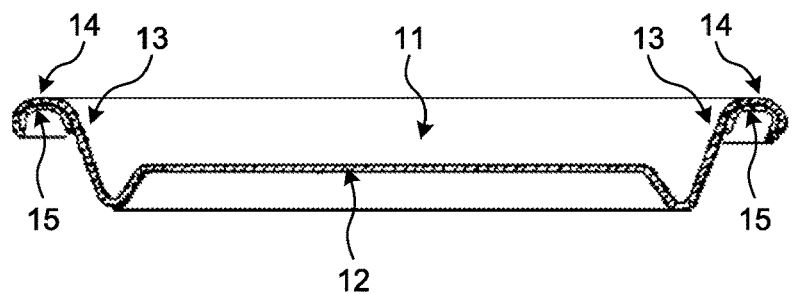
FIG. 3 is a sectional view of the can lid along I-I in FIG. 2.
Figure 4:
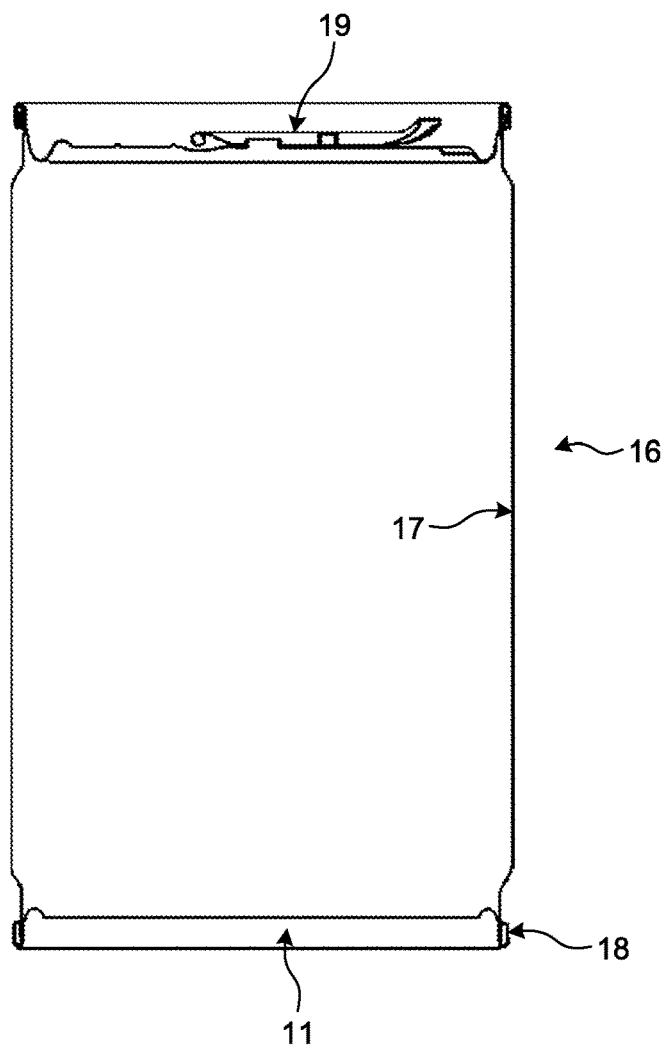
FIG. 4 is an illustration of a can structure with a can lid seamed to a can body.

Referring now to FIG. 2 to FIG. 4, an example of a can lid and a can structure formed from the resin-coated metal sheet 10 will be described. FIG. 2 is a diagram illustrating the can lid formed from the resin-coated metal sheet 10, and FIG. 3 is a sectional view of the can lid along I-I illustrated in FIG. 2. FIG. 4 is an illustration of the can structure with a can lid seamed to a can body.

The can lid is obtained by punching out the resin-coated metal sheet 10 into a can lid shape using a pressing machine and machining the cut sheet through a well-known process. As shown in FIG. 2 and FIG. 3, a can lid 11 has a chuck wall 13 on the outer periphery of a flat plate-shaped panel 12 and a seaming panel 14 curved on the outside. A well-known seam material 15 is applied and dried on the inside of the seaming panel 14 to form the can lid (bottom lid) 11.

Subsequently, as shown in FIG. 4, a can structure 16 is formed through can making by double-seaming the can lid 11 to the edge flange portion of a can body 17 to provide a seamed portion 18. In doing so, while a seaming roll presses the surface of the resin film A on the can lid exterior surface, the seaming roll is moved fast along the surface direction.

The drawn resin film A has the crystalline component in the surface direction increased in the drawing process. If seaming is performed in this state, the weak intermolecular bonds are easily broken to incur damage of the resin film A. The crystalline component in the direction vertical to the resin film A is then necessary. The ratio is such that the Raman band intensity ratio is 0.60 or more. Preferably, the Raman band intensity ratio is 0.70 or more. If the Raman band intensity ratio is less than 0.60, the amount of the crystalline component in the surface direction is large and therefore the resin film A peels off during high-speed seaming. Moreover, the degree of crystallinity of the resin film B simultaneously heat-fused on the interior surface of the can lid 11 changes to degrade the adhesion of the resin film B.

On the other hand, in the resin film B on the interior surface of the can lid 11, the half-width of the Raman band of 1730±10 cm$^{-1}$ measured on the polarization plane horizontal to the surface of the resin film B by laser Raman spectroscopy is 15 to 20 cm$^{-1}$, preferably 16 to 19 cm$^{-1}$. If the half-width of the Raman band is smaller than 15 cm$^{-1}$, the exterior resin film A having a low melting point adheres to the roll in the manufacturing process to impair the productivity. If the half-width of the Raman band is greater than 20 cm$^{-1}$, the crystallinity is insufficient and therefore adhesion of the interior resin film B is insufficient, leading to poor contents resistance.

In manufacturing of the resin-coated metal sheet 10 for use in the can lid 11, the resin film A on the exterior surface and the resin film B on the interior surface of the can lid 11 are often heat-fused simultaneously or almost simultaneously. In this case, it is necessary to appropriately select the interior resin film B so that the exterior resin film A has the degree of crystallinity as described above. As a result of study, it has been found that it is appropriate that the melting point derived from PET in the interior resin film B is 250° C. or higher and 265° C. or lower and is higher than the melting point derived from PBT in the exterior resin film A by 25° C. or more. If the melting point difference is less than 25° C., the degree of crystallinity of the exterior resin film A fails to be reduced and the Raman band intensity ratio of 0.60 or more is not achieved. It is necessary to set the melting point derived from PET to 250° C. or higher so that the melting point difference is 25° C. or higher. On the other hand, the melting point derived from PET exceeding 265° C. greatly exceeds the melting point of the exterior resin film A to possibly cause a trouble of adhesion of the resin film A to the lamination roll described later during manufacturing.

Figure 5:
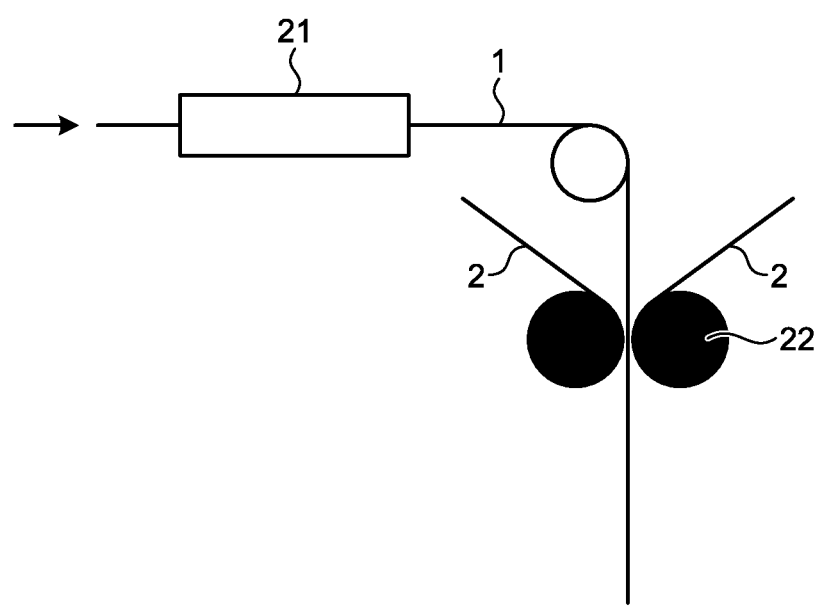
FIG. 5 is a diagram for explaining a method of heat-fusing resin films that is applied to the present invention.

Referring now to FIG. 5, a method of heat-fusing the resin films 2 on the interior and exterior surfaces will be described. For example, as shown in FIG. 5, after the temperature of the metal sheet 1 is increased to a certain temperature or higher with a metal strip heating device 21, pressure-bonding rolls 22 (hereinafter referred to as lamination rolls) are brought into pressure contact with the metal sheet 1 with the resin films 2 interposed therebetween. The resin films 2 are thus heat-fused on the surfaces of the metal sheet 1 (hereinafter this may be referred to as lamination) to produce the resin-coated metal sheet 10 of the present invention. In this case, the heat fusion of the resin films 2 on the metal sheet 1 is homogenized by bringing the pressure-bonding rolls 22 into pressure contact with the metal sheet 1 with the resin films 2 interposed therebetween.

The details of the lamination conditions will be described below. The temperature of the metal sheet 1 at the start of heat fusion is preferably in the range of +5° C. to +40° C. relative to the melting point of the resin film 2. To ensure the interlayer adhesion between the metal sheet 1 and the resin films 2 through the heat fusion process, heat flow of polyester resin at the adhesion interface is necessary. By setting the temperature of the metal sheet 1 in the temperature range of +5° C. or more relative to the melting point of the resin film 2, the interlayer resin thermally flows to improve the mutual wettability at the interface, resulting in good adhesion. Even when the temperature of the metal sheet 1 exceeds +40° C., no further effect of improving the adhesion can be expected, and the resin film 2 is excessively melted to cause roughness of the surface embossed by the surface of the lamination roll 22, transfer of the molten product to the lamination roll 22, and the like. Because of these concerns, setting the temperature to +40° C. or less is preferable.

In lamination, the pressure contact with the lamination rolls 22 for 5 msec or longer is preferable in a state in which the temperature of the metal sheet 1 is equal to or higher than the melting point of the resin film 2. This is because satisfactory wettability at the interface is achieved. The resin films 2 are melted by heat from the vicinity of the interface of the metal sheet 1 while being in mutual contact to each other. Since the thermal conductivity of the resin film 2 is extremely small, the surface layer of the resin film 2 does not reach the melting point for 5 to 40 msec. However, if the duration is longer, the temperature rises close to the melting point to cause concern of fusion on the lamination roll 22. Also in this respect, the pressure contact for 40 msec or shorter is preferable. Furthermore, the pressure contact for 10 to 25 msec is more preferable.

To achieve such lamination conditions, the temperature of the lamination rolls 22 is made controllable, because not only a high-speed operation at 150 mpm or higher but also the temperature control during heat fusion is necessary. For example, the lamination rolls 22 in FIG. 5 are internally water-cooled and allow cooling water to pass therethrough, thereby suppressing excessive heating of the resin films 2. In addition, the temperature of cooling water is preferably changed independently in each of the interior and exterior resin films 2 to control the thermal history of the resin films 2. Since the resin film 2 on the interior surface has a higher melting point, preferably, the temperature of the lamination roll 22 is set higher whereas the temperature of the lamination roll 22 on the exterior side is set lower. For example, it is preferable to provide a temperature difference such that the lamination roll 22 on the interior side is set to 120° C. and the temperature of the lamination roll 22 on the exterior side is set to 80° C. The temperature of the lamination rolls 22 is appropriately adjusted in the range of 50° C. to 130° C.

The pressure applied by the lamination roll 22 is preferably 9.8 to 294 N/cm$^2$ (1 to 30 kgf/cm$^2$) in terms of unit pressure. If the pressure applied by the lamination roll 22 is less than 9.8 N/cm$^2$, even when the temperature at the start of heat fusion is +5° C. or more relative to the melting point of the resin film 2 to ensure sufficient flowability, the force of pressing out the resin film 2 on the surface of the metal sheet 1 is too weak to obtain sufficient coating property. As a result, this may affect the performance such as adhesion and corrosion resistance (contents resistance). The pressure applied by the lamination roll 22 exceeding 294 N/cm$^2$ does not cause inconvenience in performance of the resin-coated metal sheet 10 but is uneconomical because the force exerted on the lamination roll 22 is large and necessitates strength of the facility, leading to a size increase of the device. The pressure applied by the lamination roll 22 is therefore preferably 9.8 to 294 N/cm$^2$.

The resin film A on the exterior surface of the can lid 11 is based on polybutylene terephthalate (PBT) and polyethylene terephthalate (PET), and the PBT/PET resin composition ratio (wt %) is (PBT/PET)=(40/60) to (80/20). The PBT ratio smaller than this range is not preferable because if so, whitening occurs during the retort process. The whitening during the retort process will be described later. The PBT ratio larger than this range is not preferable because if so, heating under the water vapor atmosphere deteriorates the adhesion and other characteristics.

The resin film B for use on the interior surface of the can lid 11 is composed of 95 mol % or more of polyethylene terephthalate. If polyethylene terephthalate is of less than 95 mol %, other components including the copolymerization component are mixed and dissolve into the contents to deteriorate the contents resistance. Moreover, the addition of other components reduces the melting point to deteriorate the heat fusion characteristic (adhesion) with the metal sheet 1.

The material of the interior and exterior resin films 2 may be copolymerized with other dicarboxylic acid component, glycol component, or other resin components (less than 5 mol % on the interior surface side) within a range that does not impair formability, heat resistance, and corrosion resistance. Examples of the dicarboxylic acid component include aromatic dicarboxylic acids such as isophthalic acid, naphthalene dicarboxylic acid, diphenyl dicarboxylic acid, diphenylsulfone dicarboxylic acid, diphenoxyethane dicarboxylic acid, 5-sodium sulfoisophthalic acid, and phthalic acid; aliphatic dicarboxylic acids such as oxalic acid, succinic acid, adipic acid, sebacic acid, dimer acid, maleic acid, and fumaric acid; alicyclic carboxylic acids such as cyclohexane dicarboxylic acid; and oxycarboxylic acids such as p-oxybenzoic acid.

Examples of the glycol component include ethylene glycol or aliphatic glycols such as butanediol, propanediol, pentanediol, hexanediol, and neopentyl glycol; alicyclic glycols such as cyclohexanedimethanol; aromatic glycols such as bisphenol A and bisphenol S; and diethylene glycol. The dicarboxylic acid components and the glycol components are used in combination of two or more.

Fluorescent whitening agent, antioxidant, heat stabilizer, ultraviolet absorber, plasticizer, pigment, antistatic agent, nucleating agent, and the like may be blended if necessary. For example, the inclusion of a disaso pigment in the resin film A on the exterior surface provides a bright-colored appearance because of its high coloring power with transparency and high ductility. The addition of pigment is preferably in the amount of 30 PHR or less. Here, the amount of pigment added is the ratio (with a constant resin content) relative to the resin layer including the pigment (relative to the lower resin layer when added to the lower resin layer). Examples of the disazo pigment include color indices (C.I. generic names) Pigment Yellow 12, 13, 14, 16, 17, 55, 81, 83, 180, and 181, at least one of which can be used. In particular, in view of the clarity of color tone (bright color) and bleeding resistance in the retort sterilization environment (the ability of suppressing deposition of the pigment on the film surface), pigments with a high molecular weight and poor solubility in PET resin are preferred. More preferably, C.I. Pigment Yellow 180 having a molecular weight of 700 or more and a benzimidazolone structure is used.

The resin material for forming the resin film 2 is not limited by the production process. For example, the resin material can be formed using the following process (1) or (2).

(1) Process of esterifying terephthalic acid, ethylene glycol, and a copolymerization component and then polycondensing the resultant reaction product to produce a copolymerized polyester.

(2) Process of transesterifying dimethyl terephthalate, ethylene glycol, and a copolymerization component and then polycondensing the resultant reaction product to produce a copolymerized polyester.

In production of the copolymerized polyester, additives such as fluorescent whitening agent, antioxidant, heat stabilizer, ultraviolet absorber, and antistatic agent may be added, if necessary.

The polyester resin for use in the present invention has a weight-average molecular weight in the range of 5000 to 100000, more preferably in the range of 10000 to 80000, in terms of improving the mechanical characteristics, lamination characteristics, and taste characteristics. The thickness of the polyester resin of the present invention is preferably 5 µm or more and 50 µm or less, further preferably 8 µm or more and 30 µm or less, in particular, in the range of 10 µm or more to 25 µm or less.

<Whitening During Retorting>

When a retort sterilization process is performed for the can structure 16 manufactured from the resin-coated metal sheet 10 coated with the polyester resin films 2, the phenomenon of whitening of the exterior resin film A may be observed. This is a foggy white appearance as a result of scattering of light caused by minute bubbles formed in the resin film A. In addition, the bubbles formed in the resin film A have the characteristics as follows. First, these bubbles are not formed when the can structure 16 is heated under a dry hot environment. Bubbles are not formed either when the can structure 16, not filled with contents and empty, is subjected to the retort sterilization process. Bubbles are not observed throughout the thickness direction of the exterior resin film A but are observed in the vicinity of the interface in contact with the metal sheet 1. Based on these characteristics, it can be assumed that bubbles in the exterior resin film A caused by the retort sterilization process are formed by the following mechanism.

The can structure 16 is exposed to high-temperature water vapor initially after the start of the retort sterilization process, and the water vapor partially intrudes into the inside of the exterior resin film A to reach the vicinity of the interface with the metal sheet 1. Since the vicinity of the interface between the exterior resin film A and the metal sheet 1 is cooled from the interior surface by the contents initially after the start of the retort sterilization process, the water vapor intruding into the interface becomes condensed. Subsequently, the temperature of the content increases over time in the retort sterilization process to cause re-vaporization of the condensed water at the interface with the metal sheet 1. The vaporized water vapor escapes to the outside again through the resin film A. This trace of the condensed water presumably makes bubbles. The reason why the bubbles are observed only at the vicinity of the interface with the metal sheet 1 may be that the place where condensed water is formed is the vicinity of the interface. In addition, the resin in the vicinity of the interface that is melted due to the contact with the heated metal sheet 1 is the amorphous resin, which is mechanically soft and highly deformable even after cooled and solidified, is easily deformed, and easily forms bubbles. It is therefore effective to quickly crystallize the amorphous polyester layer with the heat in the retort sterilization process and increase the strength of the amorphous layer in the exterior resin film A, in order to prevent formation of bubbles in the resin film A on the can lid exterior surface and suppress whitening during the retort sterilization process.

As described above, in the resin-coated metal sheet 10 of the present embodiment, the resin film A on the exterior surface of the can lid 11 does not suffer film peeling or film cracking even when seaming is performed on the resin-coated metal sheet 10 at high speed, has excellent seaming resistance, and, in addition, is excellent in the design of the appearance after the retort process, while the resin film B on the interior surface of the can lid 11 has excellent contents resistance and can keep the adhesion even when subjected to the retort process in a state in contact with the contents.

Although the embodiment to which the invention made by the inventors of the present invention is applied has been described above, the present invention is not intended to be limited by the description or the drawings that constitute part of the disclosure of the present invention according to the embodiment. That is, all of other embodiments, examples, and operational techniques made by those skilled in the art based on the present embodiment are embraced in the scope of the present invention.

(Example)

An example of the present invention will be described below. A steel sheet having a thickness of 0.18 mm and a width of 977 mm subjected to cold rolling, annealing, and tempering rolling was chromium-plated after degrease and acid cleaning to produce a chromium-plated steel sheet (TFS) as a metal sheet 1. The chromium plating was formed through chromium plating in a chromium plating bath including $CrO_3$, $F^-$, and $SO_4^{2-}$ and intermediate rinsing, followed by electrolysis with a passivation solution including $CrO_3$ and $F^-$. In doing so, the electrolysis conditions (current density, the quantity of electricity, and the like) were controlled such that the amount of metal chromium adhesion and the amount of chromium hydroxide adhesion were 120 mg/m$^2$ and 15 mg/m$^2$, respectively, in terms of Cr.

Subsequently, using a metal strip laminating device, the resultant chromium-plated steel sheet was heated with a metal strip heating device, and resin films were laminated (heat-fused) on both surfaces of the chromium-plated steel sheet with lamination rolls to produce a resin-coated metal sheet (laminated steel sheet) 10. The lamination rolls were internally water-cooled and allow cooling water to forcedly circulate during lamination to cool the laminated steel sheet 10 during bonding with the resin films 2. The Raman band intensity ratio by the laser Raman spectroscopy was adjusted by changing the lamination conditions for the metal strip.

The characteristics of the resin films (biaxially drawn polyester films) 2 used were determined and evaluated by the following method (1). The characteristics of the laminated steel sheet 10 produced by the above-described method were determined and evaluated by the following methods (2) to (6). Table 1 shows the characteristics and lamination conditions of the laminated resin films and the evaluation result of each laminated steel sheet 10.

(1) Measurement by Laser Raman Spectroscopy (1-1) Raman Band Intensity Ratio ($I_{90}/I_0$) of Resin Film a on the Exterior Surface of can Lid A sectional polished sample of the laminated steel sheet 10 was produced, and the Raman band intensity of 1615±10 cm$^{-1}$ was measured every micrometer on a laser polarization plane vertical to the sectional direction of the resin film A on the exterior surface of the can lid 11 under the measurement conditions below. The average value of the measurement values 5 μm from the surface layer was defined as the Raman band intensity ($I_0$). The Raman band intensity of 1615±10 cm$^{-1}$ was measured every micrometer from the surface layer on a laser polarization plane parallel to the sectional direction of the resin film A. The average value of the measurement values 5 μm from the surface layer was defined as the Raman band intensity ($I_{90}$). The Raman band intensity ratio ($I=I_{90}/I_0$) was then obtained.

(1-2) Raman Band Half-Width of Resin Film B on the Interior Surface of can Lid

The sectional polished sample of the laminated steel sheet 10 was produced, and the half-width of the Raman band of 1730±10 cm$^{-1}$ was measured every micrometer on a laser polarization plane parallel to the sectional direction of the resin film B on the interior surface of the can lid 11 under the following conditions. The average value of the measurement values 5 μm from the surface layer was obtained.

(Measurement Conditions)

Excitation light source: semiconductor laser (λ=532 nm)
Microscopic magnification: ×100
Aperture: 25 μmϕ

(2) Seaming Resistance

The laminated steel sheet 10 was punched out into the shape of a can lid using a press device and machined in a well-known process to form a can lid (bottom lid) 11 of commonly called Diameter 200 shown in FIG. 2. Specifically, the can lid was shaped such that a chuck wall 13 was formed on the outer periphery of a flat plate-shaped panel 12 and a curved seaming panel 14 was formed on the outside. A well-known seal material 15 was applied and dried on the inside of the seaming panel 14. Subsequently, the can lid 11 was seamed to the edge flange portion of a can body 17 at a rate of 800 cans per minute. The state of the (exterior) resin film A at the seamed portion 18 of the can lid 11 was observed, and the seaming resistance was evaluated according to the grading below.

(Grading)

⊚: No film peeling in 50 lid members.
○: Film peeling in 1 to 5 lids out of 50 lid members.
Δ: Film peeling in 6 to 10 lids out of 50 lid members.
x: Film peeling in 11 or more lids out of 50 lid members.

(3) Retort Whitening Resistance

The retort whitening resistance of the resin film A on the exterior surface of the can lid 11 was evaluated. Specifically, the can structure 16 formed by seaming the can lid 11 as the bottom lid of the can body 17 was filled with tap water at room temperature and thereafter sealed by seaming a top lid 19 to form the can structure 16 shown in FIG. 4. Subsequently, this can structure 16 was arranged with the bottom facing down in a vapor-type retort sterilization chamber and underwent the retort process at 125° C. for 30 minutes. After the retort process, the appearance change of the resin film A on the exterior surface of the can lid 11 was observed by visual inspection, and the retort whitening resistance was evaluated according to the following grading.

(Grading)

⊚: No appearance change.
○: Slightly foggy (less than 5% of the film surface area) in appearance.
Δ: Slightly foggy (5% or more to less than 10% of the film surface area) in appearance.
x: Whitish in appearance (whitening occurs in 10% or more of the film surface area).

(4) Adhesion (Wet Adhesion)

A flat-plate sample (15 mm width and 120 mm length) of the laminated steel sheet 10 before can making was cut out. The resin film 2 is partially stripped from the long-side end portion of the cut sample. The stripped resin film 2 was opened in a direction (angle: 180°) opposite to the direction of stripping and subjected to the retort process (125° C., 30 minutes) with a weight of 50 g fixed thereon. The peel length of the resin film 2 after the retort process was measured, and the wet adhesion (secondary adhesion) of the film before shaping was evaluated as the adhesion according to the following grading.

(Grading)

⊚: less than 10 mm
○: 10 mm or more, less than 20 mm
x: 20 mm or more (5) Contents Resistance (Coating Property of Resin Film on Interior Surface of can Lid)

The can lid 11 was seamed to the bottom of the can body 17 in the same manner as in (2) above to produce a can structure 16 (net 180 ml) having the shape shown in FIG. 4. Subsequently, after filling of tap water, the top lid 19 was seamed to the top of the can structure 16 for sealing, and the retort process (125° C., 30 minutes) was performed. After the retort process, the top lid 19 was opened after the temperature of the can structure 16 reached room temperature, and 50 ml of electrolyte (NaCl 1% solution) was poured into the can structure 16. A voltage of 6 V was applied between the can structure 16 and the electrolyte. The value of current measured at that time was evaluated. The coating property of the resin film B on the interior surface of the can lid 11 was evaluated as the contents resistance according to the following grading.
(Grading)
⊚: 0.01 mA or less
◯: exceeding 0.01 mA, 0.1 mA or less
Δ: exceeding 0.1 mA, 1 mA or less
×: exceeding 1 mA (6) Productivity The resin-coated metal sheet 10 was produced as previously mentioned, and whether the resin film 2 adhered to the lamination roll 22 and the like was observed. The productivity was evaluated according to the following grading.
(Grading)
◯: No film adhesion
×: Film adhesion

TABLE 1

| | Resin film | | | | | | | | | | | | |
|---|---|---|---|---|---|---|---|---|---|---|---|---|---|
| | Exterior surface side (A) | | | | Interior surface side (B) | | | (2)-(1) | | Retort | Adhesion | | Content |
| | (1) | | | | (2) | | | | | | | | |
| | PET (wt %) | PBT (wt %) | Melting point derived from PBT (° C.) | Raman band intensity ratio | PET (wt %) | Melting point derived from PET (° C.) | Raman band half-width (cm−1) | Melting point difference (° C.) | Seaming resistance (exterior surface side) | whitening resistance (exterior surface side) | Exterior surface side | Interior surface side | resistance (interior surface side) | Productivity |
| Inventive Example 1 | 50 | 50 | 225 | 0.61 | 95 | 255 | 16.2 | 30 | ◯ | ⊚ | ⊚ | ⊚ | ⊚ | ◯ |
| Inventive Example 2 | 50 | 50 | 224 | 0.75 | 95 | 253 | 19.6 | 29 | ⊚ | ⊚ | ⊚ | ⊚ | ◯ | ◯ |
| Inventive Example 3 | 50 | 50 | 225 | 0.77 | 95 | 250 | 16.3 | 25 | ⊚ | ⊚ | ⊚ | ⊚ | ⊚ | ◯ |
| Inventive Example 4 | 50 | 50 | 226 | 0.85 | 95 | 255 | 16.4 | 29 | ⊚ | ⊚ | ⊚ | ⊚ | ⊚ | ◯ |
| Inventive Example 5 | 50 | 50 | 226 | 0.85 | 100 | 256 | 17.2 | 30 | ⊚ | ⊚ | ⊚ | ⊚ | ⊚ | ◯ |
| Inventive Example 6 | 40 | 60 | 223 | 0.82 | 95 | 251 | 16.0 | 28 | ⊚ | ⊚ | ⊚ | ⊚ | ⊚ | ◯ |
| Inventive Example 7 | 40 | 60 | 222 | 0.79 | 97 | 256 | 16.1 | 34 | ⊚ | ⊚ | ⊚ | ⊚ | ⊚ | ◯ |
| Inventive Example 8 | 40 | 60 | 220 | 0.73 | 95 | 254 | 16.8 | 34 | ⊚ | ⊚ | ⊚ | ⊚ | ⊚ | ◯ |
| Inventive Example 9 | 40 | 60 | 221 | 0.82 | 95 | 253 | 15.8 | 32 | ⊚ | ⊚ | ⊚ | ⊚ | ⊚ | ◯ |
| Inventive Example 10 | 40 | 60 | 220 | 0.79 | 100 | 255 | 17.0 | 35 | ⊚ | ⊚ | ⊚ | ⊚ | ⊚ | ◯ |
| Inventive Example 11 | 35 | 65 | 219 | 0.80 | 95 | 252 | 16.7 | 33 | ⊚ | ⊚ | ⊚ | ⊚ | ⊚ | ◯ |
| Inventive Example 12 | 35 | 65 | 220 | 0.71 | 95 | 255 | 16.5 | 35 | ⊚ | ⊚ | ⊚ | ⊚ | ⊚ | ◯ |
| Inventive Example 13 | 35 | 65 | 220 | 0.70 | 95 | 251 | 16.0 | 31 | ⊚ | ⊚ | ⊚ | ⊚ | ⊚ | ◯ |
| Inventive Example 14 | 35 | 65 | 219 | 0.65 | 98 | 260 | 15.9 | 41 | ◯ | ⊚ | ⊚ | ⊚ | ⊚ | ◯ |
| Inventive Example 15 | 30 | 70 | 218 | 0.77 | 95 | 256 | 17.2 | 38 | ⊚ | ⊚ | ⊚ | ⊚ | ⊚ | ◯ |
| Inventive Example 16 | 30 | 70 | 215 | 0.79 | 95 | 253 | 15.5 | 38 | ⊚ | ⊚ | ◯ | ⊚ | ⊚ | ◯ |
| Inventive Example 17 | 30 | 70 | 220 | 0.63 | 95 | 252 | 18.1 | 32 | ◯ | ⊚ | ⊚ | ⊚ | ⊚ | ◯ |
| Inventive Example 18 | 30 | 70 | 220 | 0.88 | 95 | 255 | 18.5 | 35 | ⊚ | ⊚ | ⊚ | ⊚ | ⊚ | ◯ |
| Inventive Example 19 | 30 | 70 | 216 | 0.76 | 100 | 256 | 16.8 | 40 | ⊚ | ⊚ | ⊚ | ⊚ | ⊚ | ◯ |
| Comparative Example 1 | 70 | 30 | 225 | 0.81 | 95 | 255 | 15.8 | 30 | ◯ | × | ⊚ | ⊚ | ⊚ | ◯ |
| Comparative Example 2 | 10 | 90 | 220 | 0.77 | 95 | 257 | 16.7 | 37 | ◯ | ⊚ | × | ⊚ | ⊚ | ◯ |
| Comparative Example 3 | 50 | 50 | 221 | 0.44 | 95 | 256 | 16.5 | 35 | × | ⊚ | ⊚ | ⊚ | ⊚ | ◯ |
| Comparative Example 4 | 50 | 50 | 221 | 0.51 | 90 | 222 | 16.0 | 1 | × | ⊚ | ⊚ | Δ | ⊚ | ◯ |
| Comparative Example 5 | 50 | 50 | 222 | 0.49 | 95 | 240 | 15.0 | 18 | × | ⊚ | ⊚ | ◯ | ⊚ | ◯ |
| Comparative Example 6 | 50 | 50 | 221 | 0.61 | 95 | 255 | 13.5 | 34 | ◯ | ⊚ | ⊚ | × | ⊚ | × |
| Comparative Example 7 | 50 | 50 | 221 | 0.65 | 95 | 255 | 24.2 | 34 | ◯ | ⊚ | ⊚ | ⊚ | × | ◯ |

It is understood from Table 1 that the seaming resistance, the retort whitening resistance, the adhesion, the contents resistance, and the productivity are excellent within the range of the present invention.

Comparative Examples 1 and 2 show that when the PBT ratio is low in the exterior resin composition, whitening resistance is poor, and when the PBT ratio is high, the adhesion is poor. Comparative Examples 3 to 5 show that when the Raman band intensity ratio of the exterior resin film A is less than 0.60, the crystal structure is inappropriate and the seaming resistance is poor. Comparative Examples 6 and 7 show that when the half-width of the Raman band of the interior resin film B is smaller than 15 cm$^{-1}$, the adhesion on the interior surface side as well as the productivity is poor, whereas when higher than 20 cm$^{-1}$, the contents resistance is poor.

INDUSTRIAL APPLICABILITY

The present invention can provide a resin-coated metal sheet for can lids, in which film peeling or film cracking does not occur even when seaming of the can lid is performed at high speed, and the seaming resistance is excellent, the design of the appearance after the retort process and the contents resistance are excellent, and the adhesion of the film can be kept.

REFERENCE SIGNS LIST 1 metal sheet
2 resin film
3 laser oscillator
4 laser light
5 Raman scattering light
6 spectroscope
7 lens
10 resin-coated metal sheet
11 can lid
12 flat plate-shaped panel
13 chuck wall
14 seaming panel
15 seam material
16 can structure
17 can body
18 seamed portion
19 top lid
21 metal strip heating device
22 pressure-bonding roll (lamination roll)

The invention claimed is:

1. A resin-coated metal sheet for can lids, the resin-coated metal sheet comprising a metal sheet coated with thermoplastic resin films on both surfaces and formed into a can lid, wherein a thermoplastic resin film A based on polybutylene terephthalate (PBT) and polyethylene terephthalate (PET) is heat-fused on a surface of the metal sheet serving as an exterior surface of the can lid, and a thermoplastic resin film B based on polyethylene terephthalate (PET) is heat-fused on a surface of the metal sheet serving as an interior surface of the can lid, a composition ratio (wt %) of PBT/PET in the thermoplastic resin film A on the exterior surface is (PBT/PET)=(40/60) to (80/20), and the thermoplastic resin film B on the interior surface includes 95 mol % or more of PET, a melting point derived from PET of the thermoplastic resin film B on the interior surface is 250° C. or higher and 265° C. or lower and is higher than a melting point derived from PBT in the thermoplastic resin film A on the exterior surface by 25° C. or more, in the thermoplastic resin film A on the exterior surface, a Raman band intensity ratio ($I_{90}/I_0$) between Raman band intensity ($I_0$) of 1615±10 cm$^{-1}$ that is measured on a polarization plane horizontal to the surface by laser Raman spectroscopy and Raman band intensity ($I_{90}$) of 1615±10 cm$^{-1}$ that is measured on a polarization plane vertical to the surface by laser Raman spectroscopy is 0.60 or more, and in the thermoplastic resin film B on the interior surface, half-width of Raman band of 1730±10 cm$^{-1}$ that is measured on a polarization plane horizontal to the surface by laser Raman spectroscopy is 15 to 20 cm$^{-1}$.

* * * * *